United States Patent
Kura et al.

(10) Patent No.: US 8,162,766 B2
(45) Date of Patent: Apr. 24, 2012

(54) FIXED TYPE CONSTANT VELOCITY UNIVERSAL JOINT

(75) Inventors: Hisaaki Kura, Iwata (JP); Shin Tomogami, Iwata (JP); Tomoshige Kobayashi, Iwata (JP); Teruaki Fujio, Iwata (JP); Takeshi Kohara, Iwata (JP); Tomoaki Kaneko, Iwata (JP)

(73) Assignee: NTN Corporation, Osaka (JP)

( * ) Notice: Subject to any disclaimer, the term of this patent is extended or adjusted under 35 U.S.C. 154(b) by 321 days.

(21) Appl. No.: 12/525,705

(22) PCT Filed: Jan. 30, 2008

(86) PCT No.: PCT/JP2008/051451
§ 371 (c)(1),
(2), (4) Date: Aug. 4, 2009

(87) PCT Pub. No.: WO2008/099678
PCT Pub. Date: Aug. 21, 2008

(65) Prior Publication Data
US 2010/0087261 A1  Apr. 8, 2010

(30) Foreign Application Priority Data

Feb. 14, 2007 (JP) .................. 2007-033832
Feb. 14, 2007 (JP) .................. 2007-033838

(51) Int. Cl.
*F16D 3/224* (2011.01)

(52) U.S. Cl. ....................... 464/145; 464/906

(58) Field of Classification Search .................. 464/15, 464/145, 906
See application file for complete search history.

(56) References Cited

U.S. PATENT DOCUMENTS
6,736,729 B2 * 5/2004 Wang et al. ............ 464/15
(Continued)

FOREIGN PATENT DOCUMENTS
EP   1 770 290   4/2007
(Continued)

OTHER PUBLICATIONS

Leugner, L., Biodegradable Oils—How to Apply and Maintain. Machinery Lubrication Jul. 2003 [online] [retrieved on Sep. 12, 2011]. retrieved from the Internet URL: http://www.machinerylubrication.com.*

(Continued)

*Primary Examiner* — Gregory Binda
(74) *Attorney, Agent, or Firm* — Wenderoth, Lind & Ponack, L.L.P.

(57) ABSTRACT

A fixed type constant velocity universal joint includes an outer joint member having an inner spherical surface in which a plurality of track grooves extending in an axial direction are formed; an inner joint member having an outer spherical surface in which a plurality of track grooves extending in the axial direction while paired with the track grooves of the outer joint member are formed. A plurality of balls are interposed between the track grooves of each of the outer joint member and the inner joint member, for transmitting a torque, and a cage is interposed between the inner spherical surface of the outer joint member and the outer spherical surface of the inner joint member, for holding the balls. The outer joint member and the inner joint member each have a center curvature of the track grooves being offset from each other in a direction opposite to the axial direction by an equal distance with respect to a joint center, in which: a PCD gap (2×m) in a ball track formed between the track grooves of each of the outer joint member and the inner joint member is set to equal to or larger than 25 μm.

18 Claims, 13 Drawing Sheets

U.S. PATENT DOCUMENTS

| | | |
|---|---|---|
| 2003/0017877 A1 | 1/2003 | Kobayashi et al. |
| 2004/0005931 A1 | 1/2004 | Wang et al. |
| 2005/0020456 A1* | 1/2005 | Kawamura et al. |
| 2005/0059497 A1 | 3/2005 | Goto et al. |
| 2005/0148397 A1 | 7/2005 | Nakagawa et al. |
| 2005/0261066 A1 | 11/2005 | Nakagawa et al. |
| 2006/0068996 A1 | 3/2006 | Kuwabara et al. |
| 2007/0258672 A1 | 11/2007 | Tsujimoto et al. |

FOREIGN PATENT DOCUMENTS

| | | |
|---|---|---|
| JP | 03-249428 | 11/1991 |
| JP | 03-277823 | 12/1991 |
| JP | 09-317784 | 12/1997 |
| JP | 3460107 | 4/1998 |
| JP | 2002-323061 | 11/2002 |
| JP | 2005-188620 | 7/2005 |
| JP | 2006-57659 | 3/2006 |
| JP | 2006-96949 | 4/2006 |
| JP | 2006-257382 | 9/2006 |
| JP | 2006-312953 | 11/2006 |

OTHER PUBLICATIONS

International Preliminary Report on Patentability and Written Opinion of the International Searching Authority (in English) mailed Aug. 27, 2009 in corresponding International Application No. PCT/JP2008/051451.

International Search Report mailed Mar. 25, 2008 in International Application No. PCT/JP2008/051451.

Supplemental European Search Report issued Nov. 15, 2011 in corresponding European Application No. 08710645.6.

Graf v. Seherr-Thoss et al., "Gelenke und Gelenwellen", 2002, Springer Verlag, pp. 171-173, XP002660843.

* cited by examiner

FIG. 4

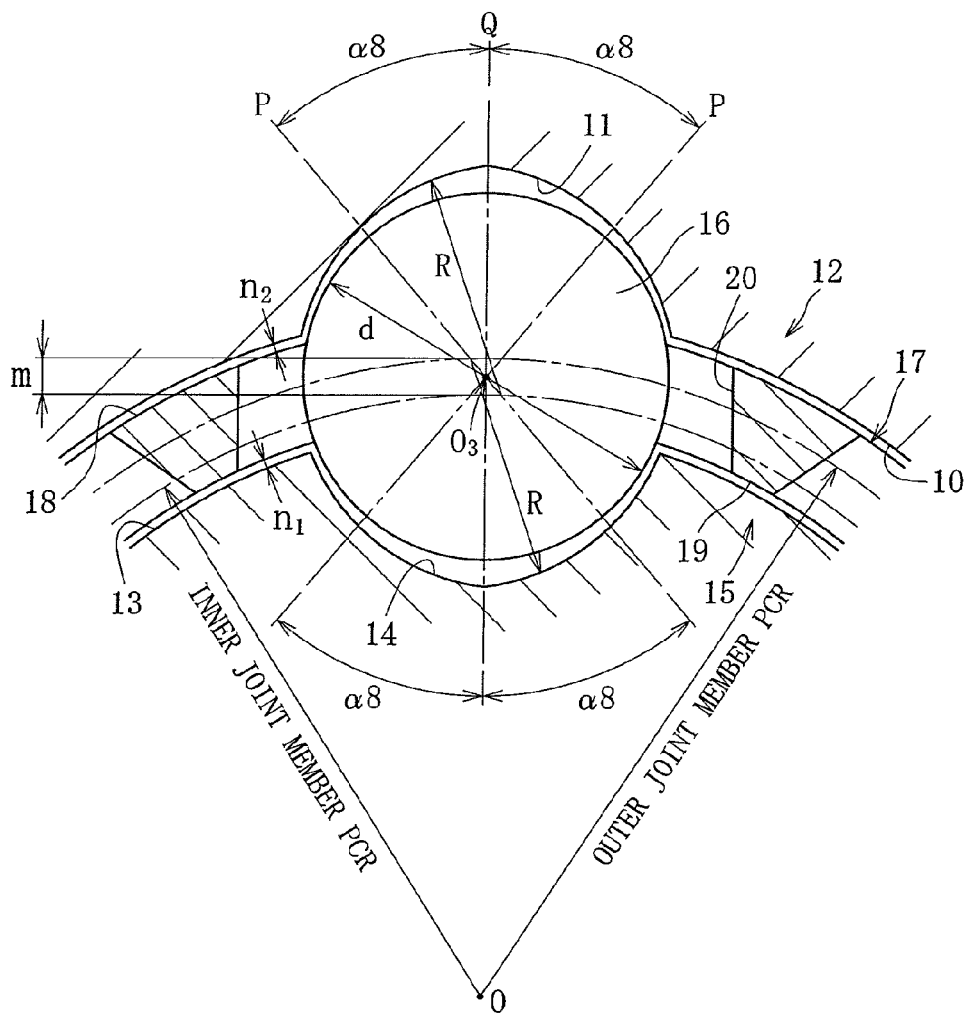

FIG. 5

| PCD GAP m (μm) | | | | | SPHERICAL SURFACE GAP BETWEEN OUTER JOINT MEMBER AND CAGE $n_2$ (μm) | | | SPHERICAL SURFACE GAP BETWEEN INNER JOINT MEMBER AND CAGE $n_1$ (μm) | | |
|---|---|---|---|---|---|---|---|---|---|---|
| 14~22 | 32~40 | 50~58 | 68~77 | 86~94 | 32~38 | 72~88 | 117~143 | 32~38 | 63~77 | 108~132 |
| × | △ | ◎ | ○ | △ | × | △ | ○ | × | △ | ○ |

◎: HIGHLY ADVANTAGEOUS  ○: ADVANTAGEOUS  △: NORMAL  ×: DISADVANTAGEOUS

FIG. 6

| PCD GAP m (μm) | | SPHERICAL SURFACE GAP BETWEEN OUTER JOINT MEMBER AND CAGE $n_2$ (μm) | | | SPHERICAL SURFACE GAP BETWEEN INNER JOINT MEMBER AND CAGE $n_1$ (μm) | | |
|---|---|---|---|---|---|---|---|
| 16~24 | 46~54 | 45~55 | 95~105 | 145~155 | 45~55 | 95~105 | 145~155 |
| × | ◎ | △ | ○ | △ | △ | ○ | ○ |

◎: HIGHLY ADVANTAGEOUS  ○: ADVANTAGEOUS  △: NORMAL  ×: DISADVANTAGEOUS

FIG. 9

| COEFFICIENT OF DYNAMIC FRICTION BETWEEN CAGE AND OUTER JOINT MEMBER | | | COEFFICIENT OF DYNAMIC FRICTION BETWEEN CAGE AND INNER JOINT MEMBER | | | COEFFICIENT OF DYNAMIC FRICTION BETWEEN TRACK AND BALL | | |
|---|---|---|---|---|---|---|---|---|
| SMALL | MEDIUM | LARGE | SMALL | MEDIUM | LARGE | SMALL | MEDIUM | LARGE |
| △ | △△ | △△ | △ | △△ | △△ | ◎ | △△ | × |

◎:HIGHLY ADVANTAGEOUS   ○:ADVANTAGEOUS
△△:SLIGHTLY ADVANTAGEOUS   △:NORMAL   ×:DISADVANTAGEOUS

FIG. 10

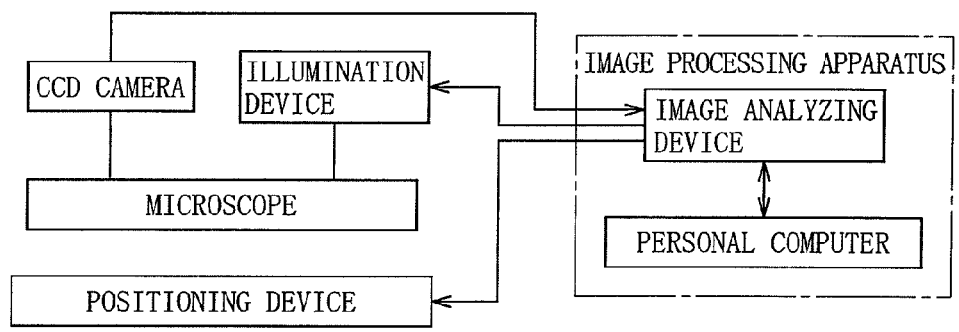

FIG. 11

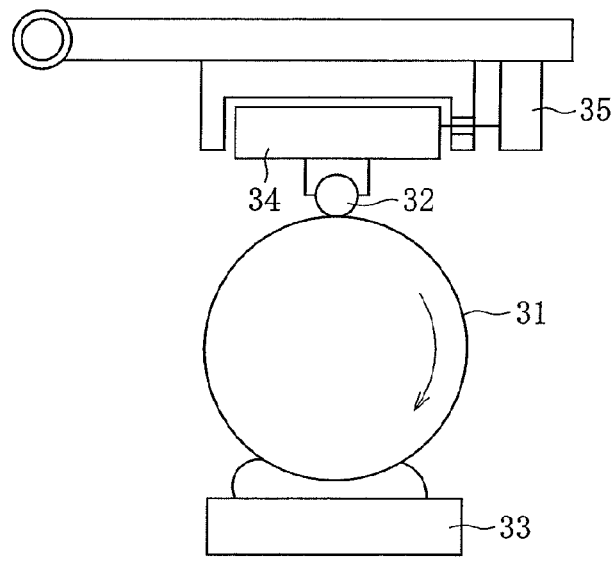

|  | EIGHT BALL | SIX BALL |
|---|---|---|
| RATIO OF LENGTH OF CONTACT POINT TRACE OF INNER JOINT MEMBER AND BALL | 1 | 1.53 |
| RATIO OF LENGTH OF CONTACT POINT TRACE OF OUTER JOINT MEMBER AND BALL | 1.06 | 1.61 |
| BALL DIAMETER RATIO | 1 | 1.25 |
| TRACK OFFSET RATIO | 1 | 1.68 |

FIXED TYPE CONSTANT VELOCITY UNIVERSAL JOINT

BACKGROUND OF THE INVENTION

I. Technical Field

The present invention relates to a fixed type constant velocity universal joint which is used, for example, in the power transmitting system of automobiles and various industrial machines and which solely allows angular displacement between two shafts on the driving side and the driven side.

II. Background Art

A fixed type constant velocity universal joint is an example of a constant velocity universal joint used as means for transmitting torque from the engine of an automobile to the wheels at constant velocity. The fixed type constant velocity universal joint connects two shafts on the driving side and the driven side and is provided with a structure allowing constant-velocity transmission of rotational torque even when the two shafts assume an operating angle. Generally, as an example of the widely-known fixed type constant velocity universal joint described above, there may be given one adopting a birfield type (BJ) or an undercut free type (UJ).

FIGS. 16 and 17, and FIGS. 18 and 19 illustrate two examples of a constant velocity universal joint of a birfield type, for example. Those constant velocity universal joints each include an outer joint member 112 having an inner spherical surface 110 in which a plurality of track grooves 111 extending in an axial direction are formed at equal circumferential intervals, an inner joint member 115 having an outer spherical surface 113 in which a plurality of track grooves 114 extending in the axial direction while paired with the track grooves 111 of the outer joint member 112 are formed at equal circumferential intervals, a plurality of balls 116 interposed between the track grooves 111 of the outer joint member 112 and the track grooves 114 of the inner joint member 115, for transmitting a torque, and a cage 117 interposed between the inner spherical surface 110 of the outer joint member 112 and the outer spherical surface 113 of the inner joint member 115, for holding the balls 116.

The track grooves 111, 114 of the constant velocity universal joint have a single circular arc shape in an axial vertical section. A center curvature $O_1$ of the track grooves 111 of the outer joint member 112 and a center curvature $O_2$ of the track grooves 114 of the inner joint member 115 are offset from each other in a direction opposite to the axial direction by equal distances F, f with respect to a joint center O including a ball center $O_3$ (track offset). Note that a center curvature of the inner spherical surface 110 of the outer joint member 112 (outer spherical surface 118 of cage 117) and a center curvature of the outer spherical surface 113 of the inner joint member 115 (inner spherical surface 119 of cage 117) correspond to the above-mentioned joint center O. As described above, owing to the provision of the track offset, a pair of the track grooves 111, 114 form a wedge-like ball track having radial intervals gradually becoming larger from the deep side of the outer joint member 112 toward the opening side.

When a constant velocity universal joint of this type is used, for example, for an automotive drive shaft, there is generally employed the structure in which the outer joint member 112 is connected to a driven shaft, and a drive shaft extending from a slide type constant velocity universal joint mounted to a differential on the vehicle body side is connected to the inner joint member 115 through spline fit-engagement. In this constant velocity universal joint, when an operating angle is assumed between the outer joint member 112 and the inner joint member 115, each of the balls 116 accommodated in the cage 117 is always maintained within the bisector plane of any operating angle, thereby securing the constant velocity property of the joint.

The plurality of balls 116 are arranged at equal circumferential intervals while accommodated in a pocket 120 formed in the cage 117. The constant velocity universal joint illustrated in FIGS. 16 and 17 has a structure in which six balls 116 are provided, and the constant velocity universal joint illustrated in FIGS. 18 and 19 has a structure in which eight balls 116 are provided. In the constant velocity universal joint of the eight ball type, the ball diameter is set smaller (d<D) and the track offset is set smaller (f<F) than those of the constant velocity universal joint of the six ball type. As a result, the compact constant velocity universal joint of high efficiency is realized.

FIG. 20 illustrates a state where an operating angle (40°, for example) is assumed in the constant velocity universal joint of the six ball type, and similarly, FIG. 21 illustrates a state where an operating angle (40°, for example) is assumed in the constant velocity universal joint of the eight ball type. As indicated with the broken line of FIG. 20, $L6_{IN}$ indicates a contact point trace in the angular contact between the inner joint member 115 and the ball 116, and $L6_{OUT}$ indicates a contact point trace in the angular contact between the outer joint member 112 and the ball 116. Further, as indicated with the broken line of FIG. 21, $L8_{IN}$ indicates a contact point trace in the angular contact between the inner joint member 115 and the ball 116, and $L8_{OUT}$ indicates a contact point trace in the angular contact between the outer joint member 112 and the ball 116.

In the constant velocity universal joint of the eight ball type illustrated in FIG. 21, as illustrated in FIG. 22, the ball diameter is set smaller. As a result, the length of the contact point trace $L8_{IN}$ of the inner joint member 115 and the ball 116, and the length of the contact point trace $L8_{OUT}$ of the outer joint member 112 and the ball 116 become smaller than those in the constant velocity universal joint of the six ball type ($L8_{IN}<L6_{IN}$, $L8_{OUT}<L6_{OUT}$). With this structure, the sliding speed between the track groove 111 of the outer joint member 112 and the ball 116 is reduced, whereby the torque transmission efficiency is increased.

Further, in the constant velocity universal joint of the eight ball type, the track offset is set smaller (f<F) as illustrated in FIG. 22. As a result, the length of the contact point trace $L8_{IN}$ of the inner joint member 115 and the ball 116, and the length of the contact point trace $L8_{OUT}$ of the outer joint member 112 and the ball 116 become smaller than those in the constant velocity universal joint of the six ball type ($L8_{IN}<L6_{IN}$, $L8_{OUT}<L6_{OUT}$). With this structure, the sliding speed between the track groove 111 of the outer joint member 112 and the ball 116 is reduced, whereby the torque transmission efficiency is increased.

Further, in the constant velocity universal joint of the eight ball type (refer to FIG. 18), the track offset is set smaller. As a result, a nip angle γ8 of the ball 116 with respect to each of the track grooves 111, 114 becomes smaller than that in the constant velocity universal joint of the six ball type (γ8<γ6) (refer to FIG. 16), and hence a force M8 for axially extruding the ball 116 to the outer joint member opening side is reduced (M8<M6).

Herein, the nip angles γ6 and γ8 of the ball 116 with respect to the track grooves 111, 114 represent angles each formed by two axial tangent lines at contact points (refer to broken lines of FIGS. 16 and 18) between the ball 116 and each of the track groove 111 of the outer joint member 112 and the track groove 114 of the inner joint member 115. Note that, in FIGS.

16 and 18, the broken line in the ball 116 indicates a contact point trace in the angular contact between the ball 116 and the track grooves 111, 114.

The force M8 for axially extruding the ball 116 to the outer joint member opening side is transmitted to the cage 117. As a result, in the constant velocity universal joint of the eight ball type, the spherical surface forces between the outer spherical surface 118 of the cage 117 and the inner spherical surface 110 of the outer joint member 112, and between the inner spherical surface 119 of the cage 117 and the outer spherical surface 113 of the inner joint member 115 become smaller than those in the constant velocity universal joint of the six ball type. With this structure, the frictional loss (heat generation) at the spherical surface contact portions are reduced, whereby the torque transmission efficiency is increased (refer to JP 3460107 B and JP 09-317784 A, for example).

Further, in order to secure the operability of the constant velocity universal joint, it is necessary to set a gap at each portion. For example, it is necessary to set a pitch circle diameter (PCD) gap and a spherical surface gap to appropriate values (refer to JP 2002-323061 A and 2005-188620 A, for example).

Herein, the PCD gap represents the difference between the PCD (outer joint member PCD) of the ball 116 in the state of being held in contact with the track groove 111 of the outer joint member 112 and the PCD (inner joint member PCD) of the ball 116 in the state of being held in contact with the track groove 114 of the inner joint member 115. Further, the spherical surface gap represents a gap between the outer spherical surface 113 of the inner joint member 115 and the inner spherical surface 119 of the cage 117, or a gap between the outer spherical surface 118 of the cage 117 and the inner spherical surface 110 of the outer joint member 112.

The PCD gap is set while taking into consideration the machining accuracy of the track grooves 114 of the inner joint member 115 and the track grooves 111 of the outer joint member 112, the operability, the damage caused by climbing up of the balls 116 from the track grooves 111, 114 at the used torque, the heat generation due to the frictional resistance in the track grooves 111, 114, the fatigue durability, and the like. Further, the spherical surface gap is similarly set while taking into consideration the machining accuracy of the outer spherical surface 113 of the inner joint member 115 and the inner spherical surface 110 of the outer joint member 112, the operability, the incorporation properties, and the like.

SUMMARY OF THE INVENTION

Incidentally, in the constant velocity universal joints of the eight ball type disclosed in JP 3460107 B, JP 09-317784 A, JP 2002-323061 A and JP 2005-188620 A described above, through reduction in the ball diameter and the track offset or setting the PCD gap and the spherical surface gap to appropriate values, the various joint functions in the constant velocity universal joint are enhanced.

That is, in JP 3460107 B, through definition of the ratio of the pitch circle diameter of the ball to the diameter thereof within the range of 3.3 to 5.0, the constant velocity universal joint is compactified, and simultaneously therewith, the strength, the load capacity, and the durability are secured which are equal to or larger than those of the constant velocity universal joint of the six ball type. Further, JP 09-317784 A, through definition of the ratio of track offset amount to the length of the segment connecting the center of the track groove of the outer joint member or the center of the track groove of the inner joint member to the center of the ball within the range of 0.069 to 0.121, the constant velocity universal joint is compactified, and simultaneously therewith, the strength, the load capacity, the durability, and the operating angle are secured which are equal to or larger than those of the constant velocity universal joint of the six ball type.

Meanwhile, in JP 2002-323061 A, through definition of the PCD gap in the ball track within the range of 5 to 50 µm, even upon application of a large load, the contact ellipse formed by the ball and the track grooves becomes less liable to extend off the track grooves, and hence the occurrence of cracking or flaking is easily suppressed, thereby increasing the durability. Further, in JP 2005-188620 A, through definition of the ratio of the spherical surface gap×1000 between the inner spherical surface of the cage and the outer spherical surface of the inner joint member to the reference inner diameter of the cage (reference outer diameter of the inner joint member) within the range of 0.9 to 2.3, the load in the bending direction is reduced which occurs at the time of variation in the operating angle of the joint.

However, in the constant velocity universal joint of the eight ball type, as disclosed in JP 3460107 B, JP 09-317784 A, JP 2002-323061 A and JP 2005-188620 A described above, through reduction in the ball diameter and the track offset or setting the PCD gap and the spherical surface gap to appropriate values, the various joint functions in the constant velocity universal joint are enhanced. Meanwhile, there is a demand for further increasing the torque transmission efficiency without significant modification of the structure of the constant velocity universal joint of the eight ball type.

Further, in the constant velocity universal joint of this type, the friction between the ball and the track groove is reduced so as to increase the torque transmission efficiency, and hence a lubricant is generally sealed inside the outer joint member. However, during the rotation of the joint, a large pressing force acts on the contact portions between the balls and each of the track grooves, and hence the oil film layers of the lubricant are less likely to be formed at the contact portions. Therefore, it is difficult to sufficiently exert the frictional force reducing effect.

It is therefore an object of the present invention to provide a fixed type constant velocity universal joint capable of further increasing a torque transmission efficiency without involving significant modification of the structure.

The present invention provides a fixed type constant velocity universal joint including: an outer joint member having an inner spherical surface in which a plurality of track grooves extending in an axial direction are formed; an inner joint member having an outer spherical surface in which a plurality of track grooves extending in the axial direction while paired with the track grooves of the outer joint member are formed; a plurality of balls interposed between the track grooves of the outer joint member and the track grooves of the inner joint member, for transmitting a torque; and a cage interposed between the inner spherical surface of the outer joint member and the outer spherical surface of the inner joint member, for holding the balls, the outer joint member and the inner joint member each having a center curvature of the track grooves being offset from each other in a direction opposite to the axial direction by an equal distance with respect to a joint center, and is characterized in that: a PCD gap in a ball track formed between the track grooves of the outer joint member and the track grooves of the inner joint member is set to equal to or larger than 25 µm; a spherical surface gap formed between the outer spherical surface of the inner joint member and an inner spherical surface of the cage is set to equal to or larger than 40 µm; and a spherical surface gap formed between an outer spherical surface of the cage and the inner spherical surface of the outer joint member is set to equal to or larger than 40 μm. Note that, the number of the balls, each of the number of the track grooves of the outer joint member, and the number of the track grooves of the inner joint member are desirably eight.

Herein, the PCD gap represents the difference between the PCD (outer joint member PCD) of the ball in the state of being held in contact with the track groove of the outer joint member and the PCD (inner joint member PCD) of the ball in the state of being held in contact with the track groove of the inner joint member. Further, the spherical surface gap represents a gap between the outer spherical surface of the inner joint member and the inner spherical surface of the cage, or a gap between the outer spherical surface of the cage and the inner spherical surface of the outer joint member.

In the present invention, the PCD gap in the ball track is set to equal to be or larger than 25 μm, or preferably to 40 to 85 μm, that is, the PCD gap is set larger than that in conventional ones. As a result, upon transmission of rotational torque, the contact of the ball with the portion on the no-load side of the ball track can be reduced, and hence the loss of transmitted torque due to the contact of the ball to the no-load side of the ball track can be reduced.

Further, the spherical surface gap between the outer spherical surface of the inner joint member and the inner spherical surface of the cage, and the spherical surface gap formed between the outer spherical surface of the cage and the inner spherical surface of the outer joint member are set to equal to or larger than 40 μm, or preferably to 50 to 120 μm, that is, the spherical surface gaps are set larger than those in conventional ones. As a result, it is possible to reduce the spherical surface contact between the outer spherical surface of the inner joint member and the inner spherical surface of the cage, and the spherical surface contact between the outer spherical surface of the cage and the inner spherical surface of the outer joint member. Thus, frictional heating due to the spherical surface contacts can be reduced, whereby the loss of transmitted torque caused by the frictional heating can be reduced. Note that, it is necessary to set the spherical surface gaps such that the spherical surface contact is reliably reduced while taking the PCD gap into consideration.

In the above-mentioned structure of the present invention, it is desirable that the outer joint member have an inner portion filled with an lubricant, and the balls each have a surface with a large number of minute recessed portions formed therein at random. With this structure, even in the case where the pressing force acts between the balls and the track grooves during the rotation of the joint, the lubricant intruding into the large number of minute recessed portions formed in the surface of each of the balls can be interposed on contact boundary surfaces between the balls and the track grooves so as to form excellent oil film layers. As a result, the friction caused between the balls and the track grooves can be reduced.

Note that, it is desirable that the above-mentioned lubricant have a coefficient of friction of equal to or smaller than 0.07. Further, as the lubricant, it is desirable to use a urea grease of a consistency number 0 to 2. With use of the lubricant as described above, the friction caused between the balls and the track grooves can be effectively reduced.

Further, it is desirable to set to Ra 0.03 to 0.6 μm a surface roughness of each of the balls in which the large number of minute recessed portions are formed, or preferably to Ra 0.05 to 0.15 μm, to set to equal to or smaller than −1.0 a parameter skewness (SK) value of the surface roughness of each of the balls, or preferably to −4.9 to −1.0, and to set to 10 to 40% a ratio of a total area of the minute recessed portions with respect to a surface area of each of the balls. With the values set as described above, the lubricant can be caused to adequately intrude into the minute recessed portions in the surface of the ball so as to be retained, to thereby form the oil film layers of the lubricant between the balls and the track grooves. With this structure, the friction between the balls and the track grooves can be effectively reduced.

Further, in the present invention, it is desirable to set to 8.5 to 12.5° a nip angle γ8 of each of the balls located between the track grooves of the outer joint member and the track grooves of the inner joint member with respect to the track grooves, and set to 30 to 38° a contact angle α8 of each of the balls with respect to the track grooves.

Herein, the nip angle γ8 (refer to FIGS. 1 and 2) of the ball with respect to the track grooves represents an angle formed by two axial tangent lines at contact points (refer to broken lines of FIGS. 1 and 2) between the ball 16 and each of the track groove 11 of the outer joint member 12 and the track groove 14 of the inner joint member 15. Further, the contact angle α8 (refer to FIG. 4) of the ball 16 with respect to the track grooves 11, 14 represents an angle formed by a line P passing a ball center $O_3$ and contact points (gaps are exaggerated in the drawing) and a line Q passing the ball center $O_3$ and a joint center O.

Note that the present invention is applicable to both a fixed type constant velocity universal joint of a birfield type (BJ) including an outer joint member and an inner joint member with track grooves each having a single circular arc shape in an axial vertical section, and a fixed type constant velocity universal joint of an undercut free type (UJ) including an outer joint member and an inner joint member with track grooves each having a straight bottom parallel with the axial direction.

According to the present invention, the PCD gap is set to equal to or larger than 25 μm in the ball track. As a result, upon transmission of rotational torque, the contact of the ball with the portion on the no-load side of the ball track can be reduced, and hence the loss of transmitted torque due to the contact of the ball to the no-load side of the ball track can be reduced. Further, the spherical surface gap between the outer spherical surface of the inner joint member and the inner spherical surface of the cage, and the spherical surface gap between the outer spherical surface of the cage and the inner spherical surface of the outer joint member are set to equal to or larger than 40 μm. As a result, it is possible to reduce the spherical surface contact between the outer spherical surface of the inner joint member and the inner spherical surface of the cage, and the spherical surface contact between the outer spherical surface of the cage and the inner spherical surface of the outer joint member. Thus, frictional heating due to the spherical surface contact can be reduced, whereby the loss of transmitted torque caused by the frictional heating can be reduced.

As described above, owing to the PCD gap and the spherical surface gap set within the range of appropriate values, the loss of transmitted torque due to the contact of the ball and the frictional heating can be reduced. As a result, a torque transmission efficiency of the constant velocity universal joint can be increased without involving significant modification of the structure of the constant velocity universal joint.

BRIEF DESCRIPTION OF THE DRAWINGS

FIG. 4 is an enlarged sectional view of a main portion including an inner joint member, an outer joint member, a ball, and a cage, for illustrating a PCD gap, a spherical surface gap, a contact angle of a ball, and a configuration of a track.

FIG. 5 shows a table for describing the contribution degree to a torque transmission efficiency in response to the variation in PCD gap and spherical surface gap at each contact portion of an internal structure of a joint.

FIG. 6 shows a table for describing a case where a coefficient of internal friction is taken into consideration as a variable, with reference to the contribution degree to a torque transmission efficiency in response to the variation in PCD gap and spherical surface gap at each contact portion of an internal structure of a joint.

FIG. 9 shows a table for describing the contribution degree to a torque transmission efficiency in response to the variation in coefficient of friction at each contact portion of an internal structure of a joint.

FIG. 10 illustrates a schematic diagram of a measuring apparatus for conducting quantitative measurement of a large number of minute recessed portions formed in the ball.

FIG. 11 illustrates a schematic view of a Savan's friction and wear testing machine.

DETAILED DESCRIPTION OF THE INVENTION

Figure 1:
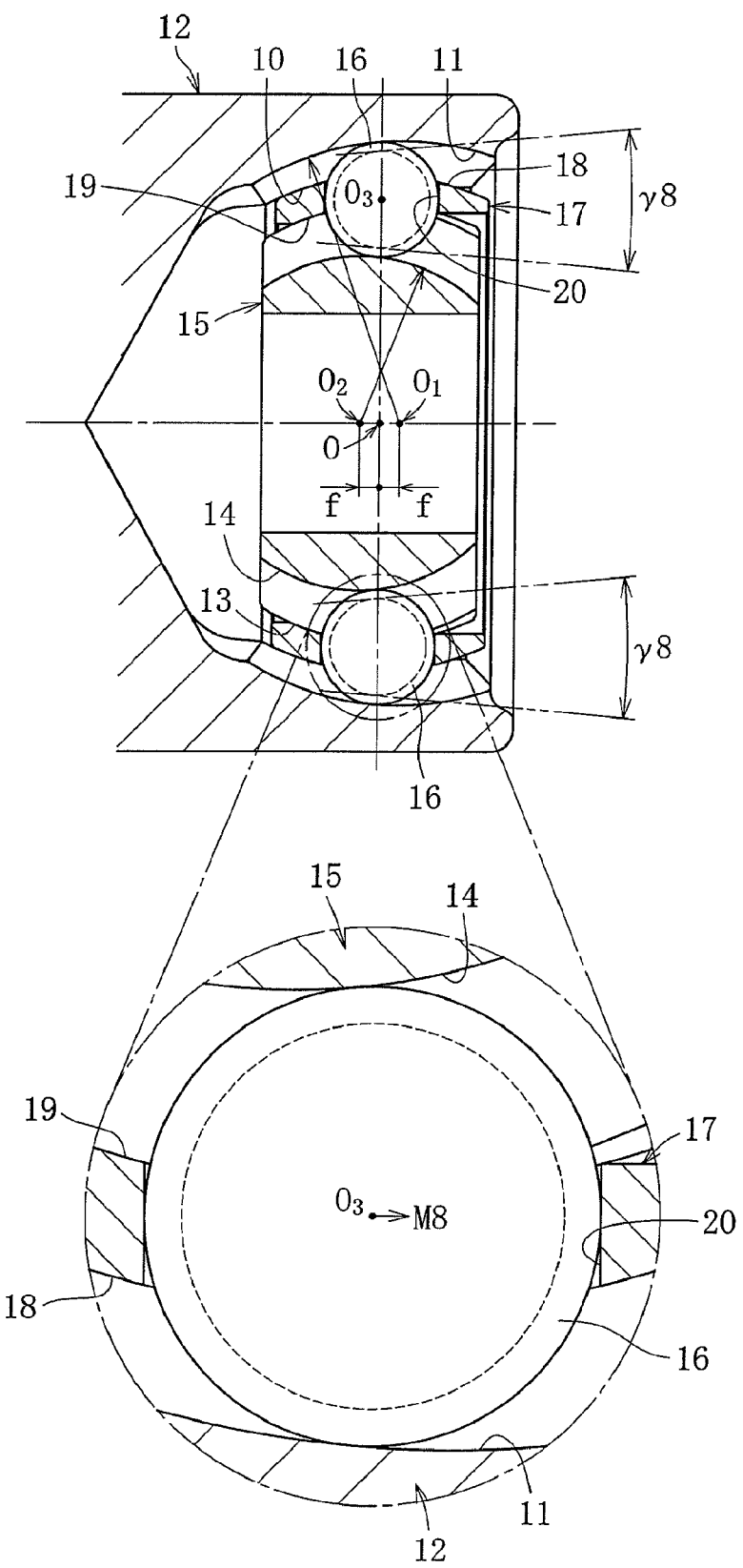
FIG. 1 illustrates a vertical sectional view of the entire structure of a fixed type constant velocity universal joint of a birfield type according to an embodiment of the present invention.
Figure 2:
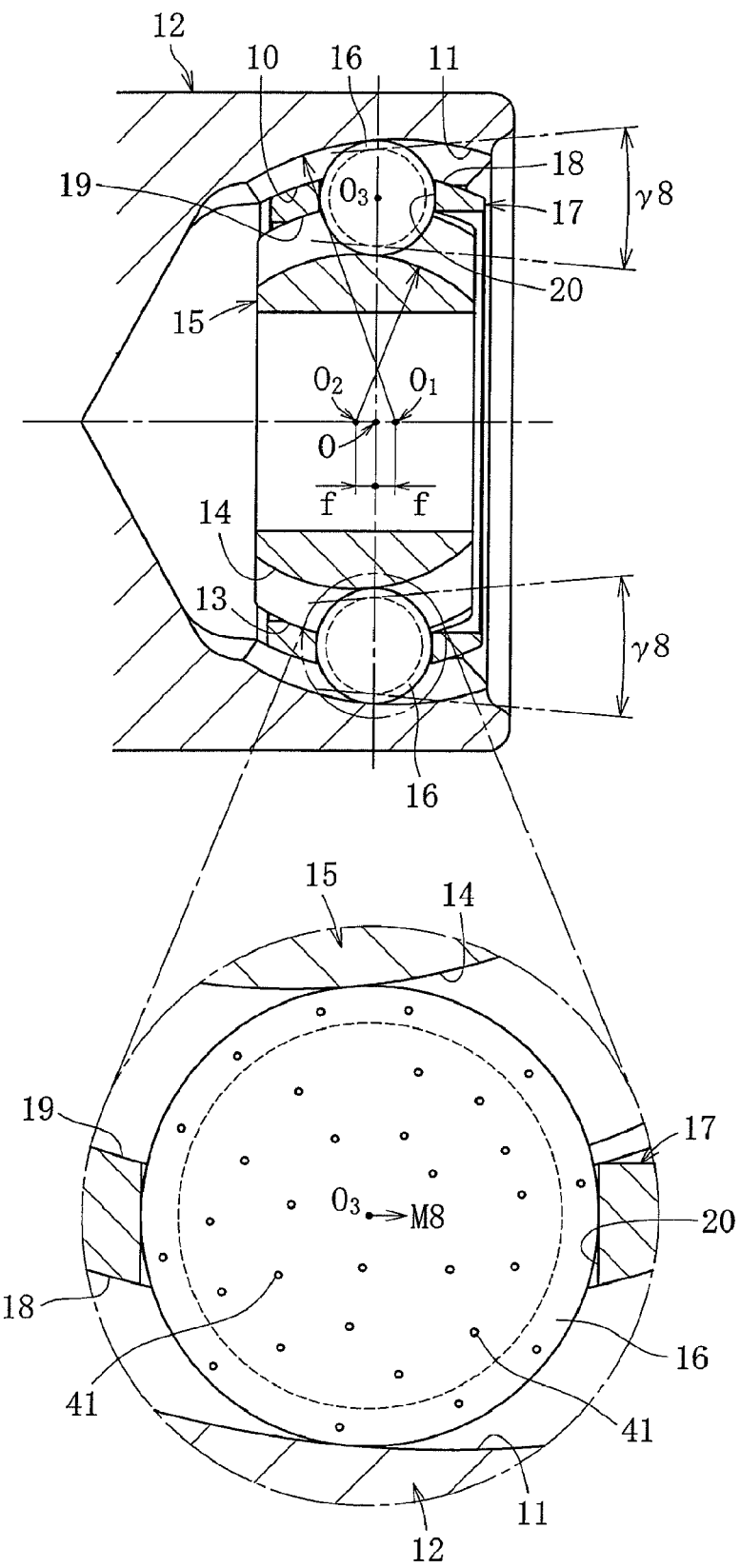
FIG. 2 illustrates a vertical sectional view of the entire structure of a fixed type constant velocity universal joint of a birfield type according to another embodiment of the present invention.
Figure 15:
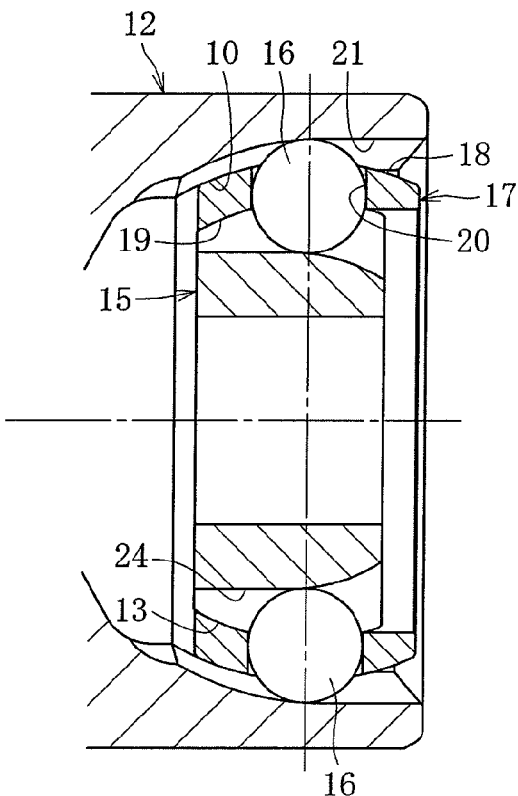
FIG. 15 illustrates a vertical sectional view of the entire structure of a fixed type constant velocity universal joint of an undercut free type according to another embodiment of the present invention.

A fixed type constant velocity universal joint according to an embodiment of the present invention is described in detail. Two embodiments of FIGS. 1 and 2 each illustrate a fixed type constant velocity universal joint of a birfield type (BJ) including an outer joint member and an inner joint member with track grooves each having a single circular arc shape in an axial vertical section. Note that, as illustrated in FIG. 15, the present invention is also applicable to a fixed type constant velocity universal joint of an undercut free type (UJ) including an outer joint member and an inner joint member which are respectively provided with track grooves 21, 24 each having a straight bottom parallel with the axial direction. The same components as those of FIGS. 1 and 2 are each denoted by the same reference symbols, and the redundant description thereof is omitted. Further, the present invention is also applicable to fixed type constant velocity universal joints having configurations of the track grooves other than those birfield type or undercut free type.

Figure 3:
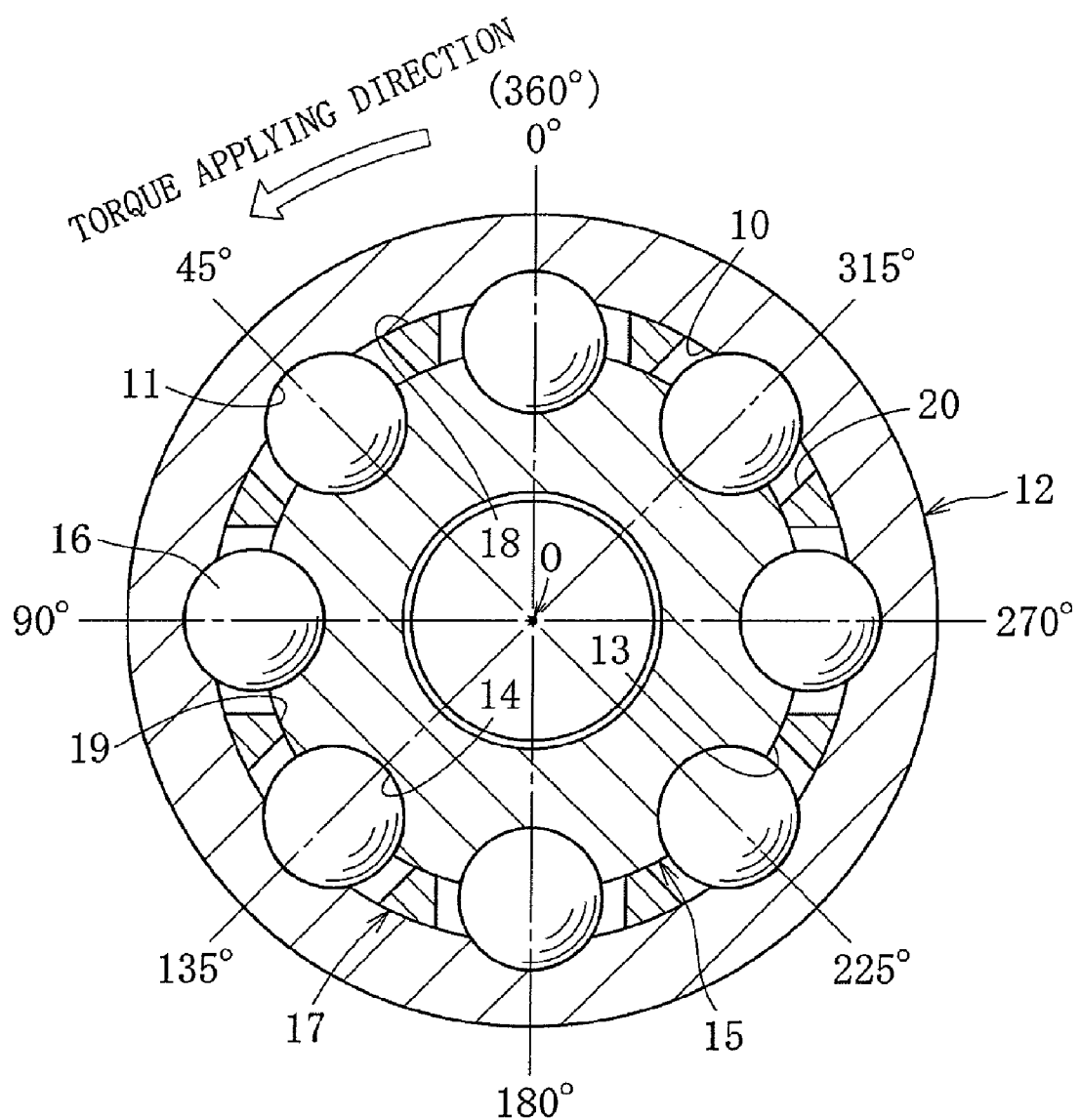
FIG. 3 illustrates a lateral sectional view of FIGS. 1 and 2.

The fixed type constant velocity universal joints of an eight ball type of FIGS. 1 and 2 each include: an outer joint member 12 having an inner spherical surface 10 in which a plurality of track grooves 11 extending in an axial direction are formed at equal circumferential intervals; an inner joint member 15 having an outer spherical surface 13 in which a plurality of track grooves 14 extending in the axial direction while paired with the track grooves 11 of the outer joint member 12 are formed at equal circumferential intervals; eight balls 16 interposed between the track grooves 11 of the outer joint member 12 and the track grooves 14 of the inner joint member 15, for transmitting a torque; and a cage 17 interposed between the inner spherical surface 10 of the outer joint member 12 and the outer spherical surface 13 of the inner joint member 15, for holding the balls 16 (refer to FIG. 3).

The track grooves 11, 14 of the constant velocity universal joint have a single circular arc shape in an axial vertical section. A center curvature $O_1$ of the track grooves 11 of the outer joint member 12 and a center curvature $O_2$ of the track grooves 14 of the inner joint member 15 are offset from each other in a direction opposite to the axial direction by an equal distance f with respect to a joint center O including a ball center $O_3$ (track offset). Note that a center curvature of the inner spherical surface 10 of the outer joint member 12 (outer spherical surface 18 of cage 17) and a center curvature of the outer spherical surface 13 of the inner joint member 15 (inner spherical surface 19 of cage 17) correspond to the above-mentioned joint center O. As described above, owing to the provision of the track offset, a pair of the track grooves 11, 14 form a wedge-like ball track having radial intervals gradually becoming larger from the deep side of the outer joint member 12 toward the opening side.

FIG. 4 is a lateral sectional view illustrating the outer joint member 12, the inner joint member 15, the ball 16 arranged between the track groove 11 of the outer joint member 12 and the track groove 14 of the inner joint member 15, and the cage 17 arranged between the inner spherical surface 10 of the outer joint member 12 and the outer spherical surface 13 of the inner joint member 15. As illustrated in the drawing, the track grooves 11, 14 have a lateral section formed in a configuration of Gothic arch which has a radius curvature R larger than the radius of the ball 16 (d/2). Owing to the configuration of Gothic arch in the lateral section of the track grooves 11, 14, the ball 16 is held in angular contact with each of the track grooves 11, 14 at two points.

Note that, in FIG. 4, for the sake of convenience of illustration of the PCD gap and the spherical surface gap, the gaps are exaggeratedly illustrated in a state where the ball 16 and each of the track groove 11 of the outer joint member 12 and the track groove 14 of the inner joint member 15 are out of contact with each other, and where the outer spherical surface 18 of the cage 17 and the inner spherical surface 10 of the outer joint member 12, and the inner spherical surface 19 of the cage 17 and the outer spherical surface 13 of the inner joint member 15 are out of contact with each other. However, when bearing rotational torque, the ball 16 and each of the track groove 11 of the outer joint member 12 and the track groove 14 of the inner joint member 15 are brought into contact with each other, and further, the outer spherical surface 18 of the cage 17 and the inner spherical surface 10 of the outer joint member 12, and the inner spherical surface 19 of the cage 17 and the outer spherical surface 13 of the inner joint member 15 are brought into contact with each other.

In order to secure the operability of the constant velocity universal joint, it is necessary to set a gap at each portion.

For example, it is necessary to set a pitch circle diameter (PCD) gap and a spherical surface gap to appropriate values. Further, in order to improve the movement of the ball 16 in the ball track, it is necessary to set to appropriate values the nip angle γ8 (refer to FIGS. 1 and 2) of the ball 16 with respect to the track grooves 11, 14 and a contact angle α8 (refer to FIG. 4).

In this case, as illustrated in FIG. 4, a gap m is the difference between the outer joint member PCR (½ of the outer joint member PCD) of the ball 16 in the state of being held in contact with the track groove 11 of the outer joint member 12 and the inner joint member PCR (½ of the inner joint member PCD) of the ball 16 in the state of being held in contact with the track groove 14 of the inner joint member 15, and hence the PCD gap is twice as large as the radial gap m. Further, a gap $n_1$ is the difference between the radius of the outer spherical surface 13 of the inner joint member 15 and the radius of the inner spherical surface 19 of the cage 17, and a gap $n_2$ is the difference between the radius of the outer spherical surface 18 of the cage 17 and the radius of the inner spherical surface 10 of the outer joint member 12. Accordingly, the spherical surface gap is twice as large as the radial gaps $n_1$, $n_2$.

Further, the nip angle γ8 (refer to FIGS. 1 and 2) of the ball 16 with respect to the track grooves 11, 14 represents an angle formed by two axial tangent lines at contact points (refer to broken lines of FIGS. 1 and 2) between the ball 16 and each of the track groove 11 of the outer joint member 12 and the track groove 14 of the inner joint member 15. Note that, in FIGS. 1 and 2, the broken line in the ball 16 indicates a contact point trace in the angular contact between the ball 16 and the track grooves 11, 14. Further, the contact angle α8 (refer to FIG. 4) of the ball 16 with respect to the track grooves 11, 14 represents, with reference to the ball center $O_3$ of the ball 16, an angle formed by ball contact centers P (gaps are exaggerated between ball 16 and track grooves 11, 14 in the drawing) at which the ball 16 and the track grooves 11, 14 are brought into contact with each other and a groove bottom center Q of the track grooves 11, 14.

When those constant velocity universal joints are used, for example, for an automotive drive shaft, the outer joint member 12 is connected to a driven shaft, and a drive shaft (shaft) extending from a slide type constant velocity universal joint mounted to a differential on the vehicle body side is connected to the inner joint member 15 through spline fit-engagement. In those constant velocity universal joints, when an operating angle is assumed between the outer joint member 12 and the inner joint member 15, each of the balls 16 accommodated in the cage 17 is always maintained within the bisector plane of any operating angle, thereby securing the constant velocity property of the joint.

Figure 16:
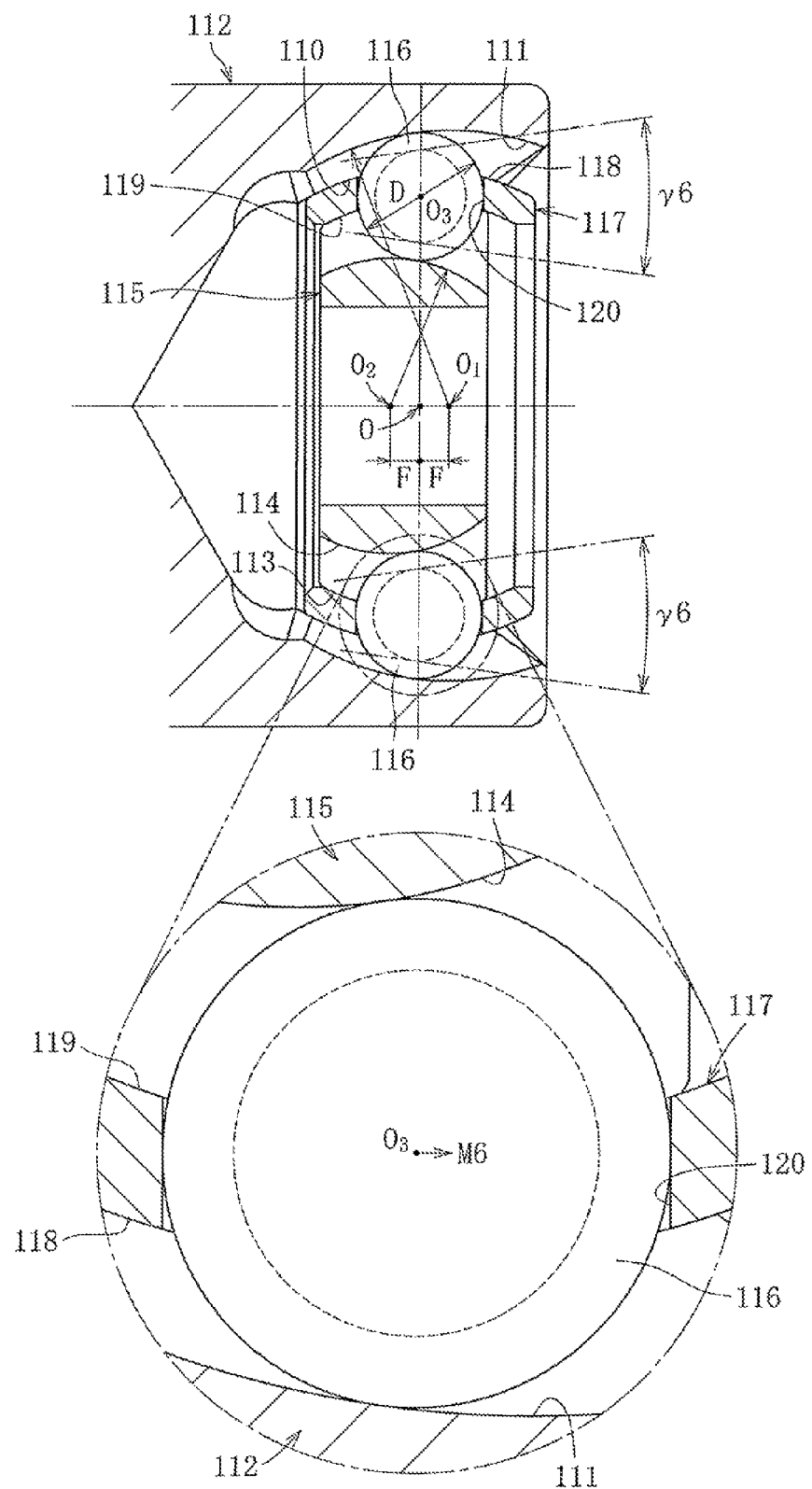
FIG. 16 illustrates a vertical sectional view of the entire structure of a fixed type constant velocity universal joint of a conventional example, which is of a six ball type.
Figure 17:
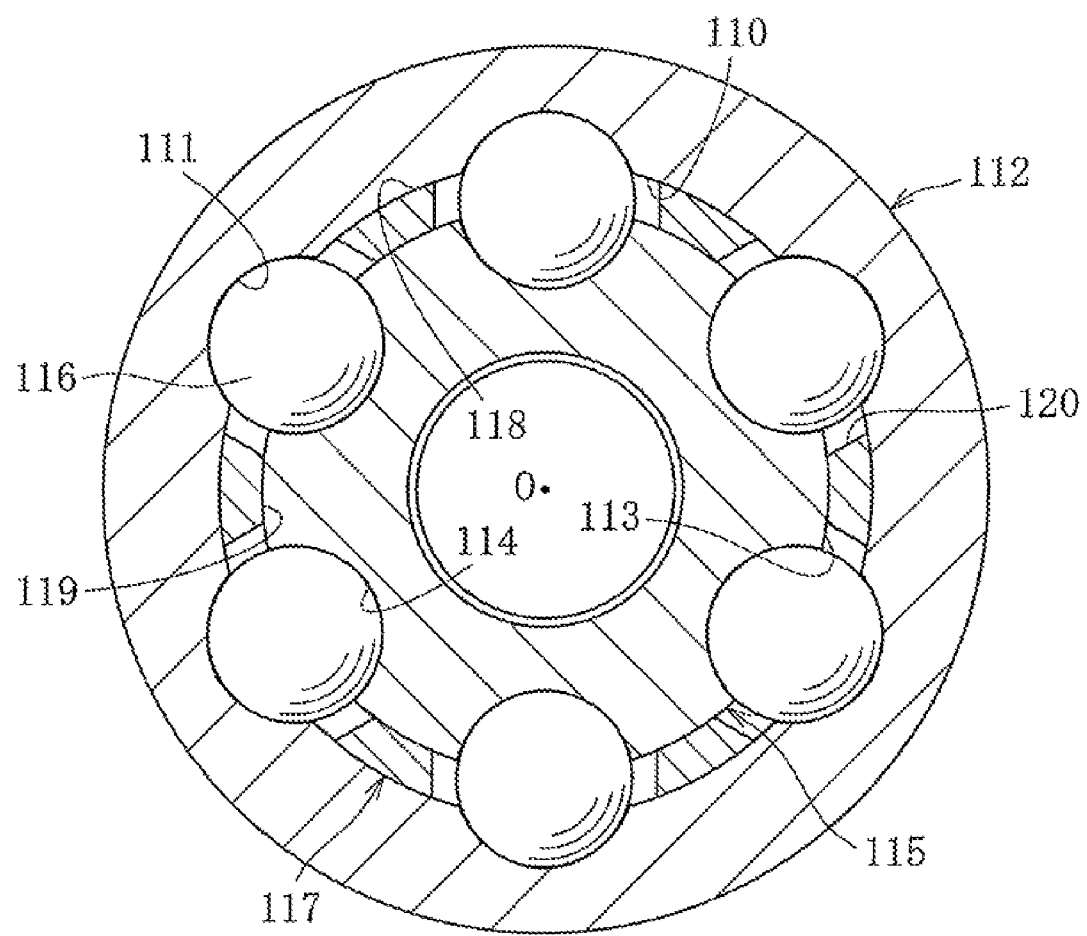
FIG. 17 is a lateral sectional view of FIG. 16.
Figure 18:
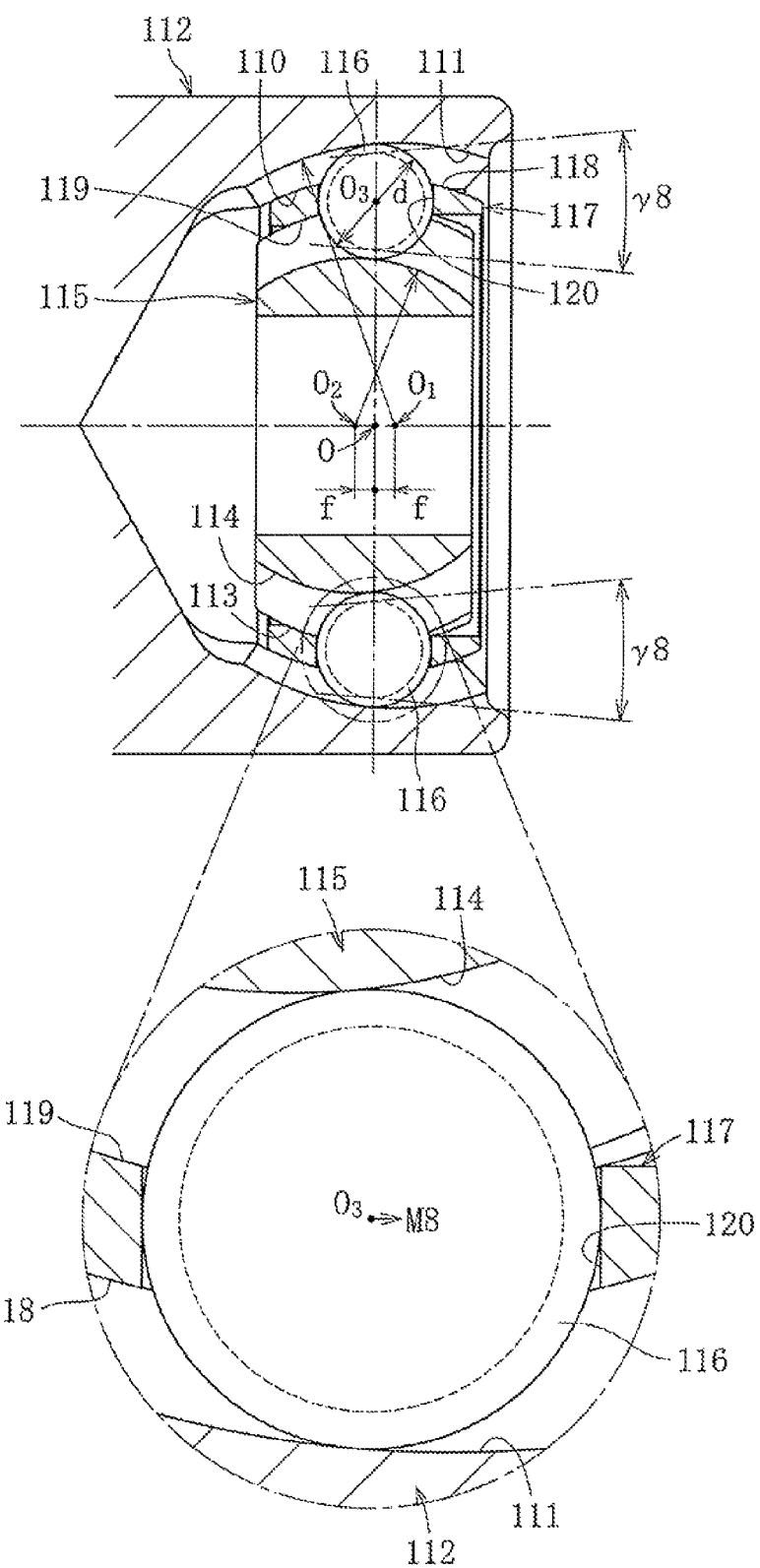
FIG. 18 is a vertical sectional view of the entire structure of a fixed type constant velocity universal joint of a conventional example, which is of an eight ball type.
Figure 19:
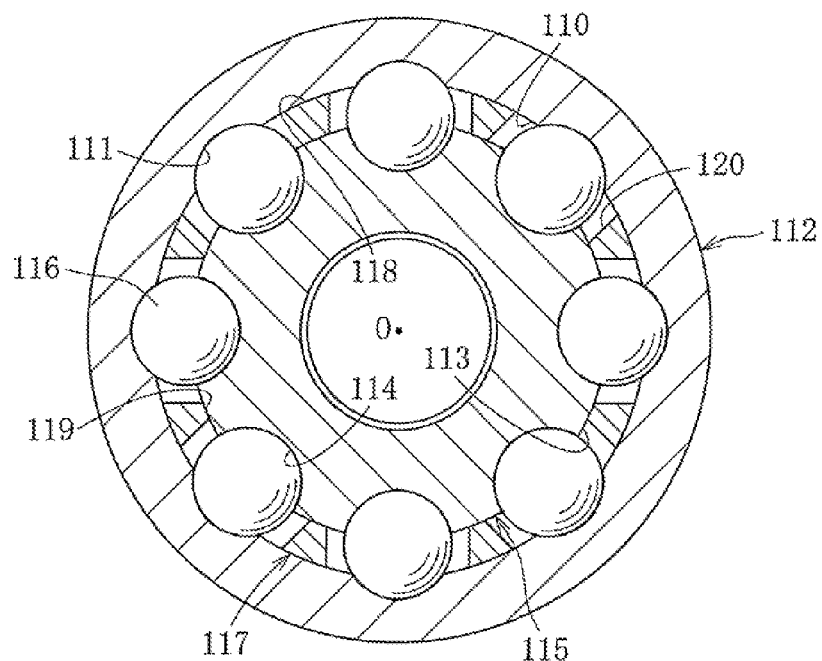
FIG. 19 is a lateral sectional view of FIG. 18.
Figure 20:
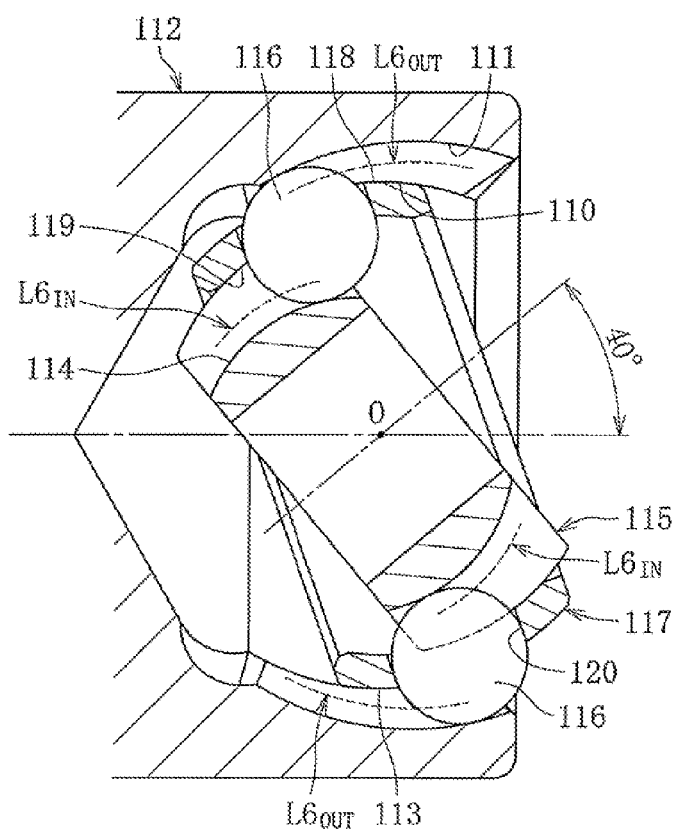
FIG. 20 is a vertical sectional view illustrating a state where an operating angle is assumed in the constant velocity universal joint of FIG. 16.
Figures 21, 22:
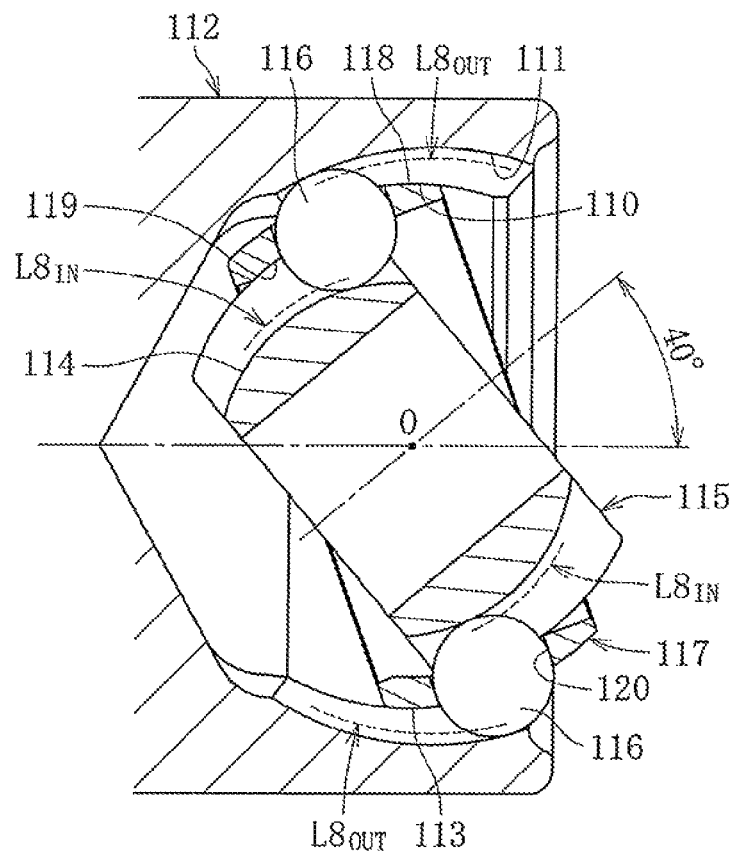
FIG. 21 is a vertical sectional view illustrating a state where an operating angle is assumed in the constant velocity universal joint of FIG. 18.
FIG. 22 shows a table obtained through comparison of a ball diameter, a track offset amount, and a length of a contact point trace between the six ball type and the eight ball type.

A plurality of the balls 16 are arranged at equal circumferential intervals while accommodated in pockets 20 formed in the cage 17. Each of the number of the track grooves 11, 14 and the pockets 20 of the cage 17 are eight as well as that of the balls 16. In this constant velocity universal joint of the eight ball type, the ball diameter is set smaller (d<D) and the track offset is set smaller (f<F) than those of the constant velocity universal joint of the six ball type (refer to FIG. 16). As a result, the compact constant velocity universal joint of high torque transmission efficiency is realized.

The results of the examination of the influence on the torque transmission efficiency in the internal structure of the constant velocity universal joint by means of mechanism analysis showed that, when the gap at each contact portion was varied in the internal structure, the PCD gap contributed to the torque transmission efficiency in a certain range, and the larger spherical surface gap more contributed to the torque transmission efficiency (refer to FIG. 5). Further, FIG. 6 shows the contribution degree to the torque transmission efficiency in response to the variation in PCD gap and spherical surface gap at each contact portion in the internal structure of the joint, in the case where a coefficient of internal friction varied in accordance with the change in lubricant sealed inside the outer joint member is also taken into consideration as a variable.

In this context, in this constant velocity universal joint, it is necessary to set to appropriate values the pitch circle diameter (PCD) gap (2×m), the spherical surface gaps (2×$n_1$), (2×$n_2$), the nip angle γ8 and the contact angle α8 of the ball 16 with respect to the track grooves 11, 14. Therefore, those are defined as described below.

First, the PCD gap (2×m) in the ball track formed by the track groove 11 of the outer joint member 12 and the track groove 14 of the inner joint member 15 is set to equal to or larger than 25 μm, or preferably to 40 to 85 μm. When the PCD gap (2×m) is defined as described above, upon transmission of rotational torque, the contact of the ball 16 with the portion on the no-load side of the ball track can be reduced. As a result, the loss of transmitted torque due to the contact of the ball with the portion on the no-load side of the ball track can be reduced.

In this case, when the above-mentioned PCD gap (2×m) is smaller than 25 μm, it is difficult to incorporate the ball 16, and hence the ball 16 is prevented from rolling owing to an increased force for constraining the ball 16 between the track grooves 11, 14. Accordingly, slipping is liable to be generated at contact portions between the ball 16 and the track grooves 11, 14, which contributes to an increase in temperature and shortening of a life. As a result, it is difficult to reduce the loss of transmitted torque. In contrast, when the PCD gap (2×m) is larger than 85 μm, edge cracking is liable to occur owing to slapping sound, vibration, and, the ball 16 which climbs, while bearing a large load, over the track grooves 11, 14 such that the contact ellipse extends off the track grooves 11, 14, which contributes to shortening of a life. As a result, the effect of reducing the loss of transmitted torque has peaked.

The results of the analysis of the force inside the joint conducted by the applicant of the present invention shows that, when the operating angle is 0°, the contact portion between the track groove 14 of the inner joint member 15 and the ball 16, and the contact portion between the track groove 11 of the outer joint member 12 and the ball 16 are each provided at one position on the load side. At the contact portions, when the operating angle exceeds 0°, frictional heating is generated for rolling the ball 16 in the track grooves 11, 14. Then, when the operating angle is increased, the ball comes into contact on the no-load side on the side opposite to the contact portion between the track groove 14 of the inner joint member 15 and the ball 16, and on the no-load side on the side opposite to the contact portion between the track groove 11 of the outer joint member 12 and the ball 16, and the load is applied to the track grooves 11, 14 owing to the contact. The load applied on the no-load side is increased in range and absolute amount in proportion to an increase in operating angle. On the no-load side, the load is applied in the direction opposite to the torque transmission direction, and consequently the loss of transmission of torque is caused.

Figure 7:
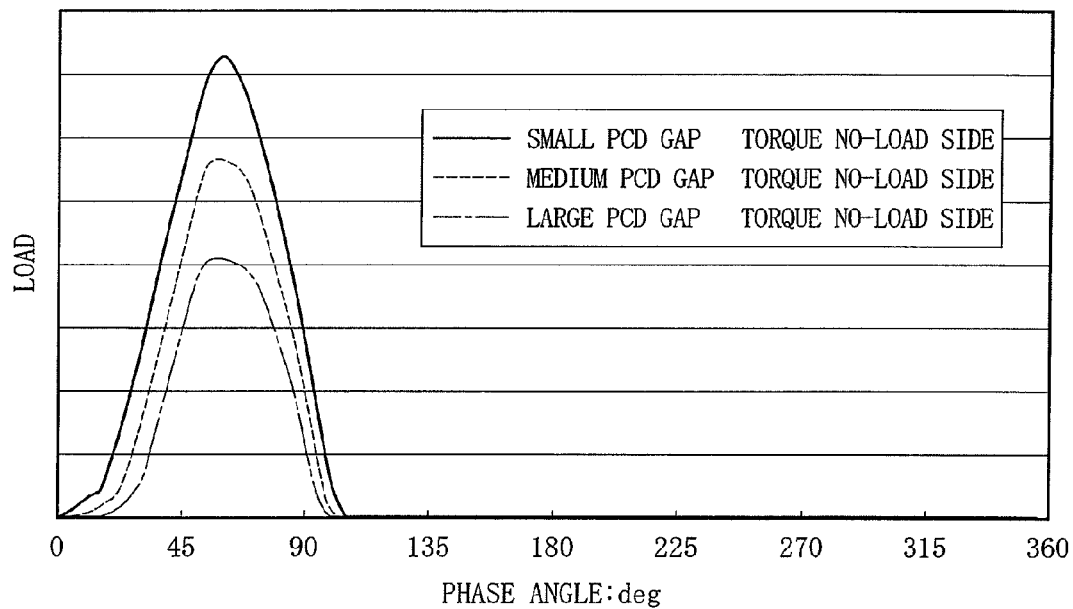
FIG. 7 is a characteristic graph showing a track load on a no-load side varied in accordance with the PCD gap.

In this context, as described above, owing to the PCD gap ($2 \times m$) set to equal to or larger than 25 μm, or preferably set to 40 to 85 μm in the ball track so as to be larger than that of the conventional constant velocity universal joint, the load applied on the no-load side is decreased, and hence the loss of transmitted torque is reduced. As a result, the torque transmission efficiency can be enhanced (refer to FIGS. 5, 6, and 7 (FIG. 3 regarding phase angle)). FIG. 7 shows that the load applied on the no-load side near the phase angle 60° can be more reduced in the one in which the PCD gap is smaller than in the one in which the PCD gap is larger.

Further, the spherical surface gap ($2 \times n_1$) between the outer spherical surface 13 of the outer joint member 15 and the inner spherical surface 19 of the cage 17, and the spherical surface gap ($2 \times n_2$) between the outer spherical surface 18 of the cage 17 and the inner spherical surface 10 of the outer joint member 12 are set to equal to or larger than 40 μm, or preferably to 50 to 120 μm. As a result, it is possible to reduce the spherical surface contact between the outer spherical surface 13 of the inner joint member 15 and the inner spherical surface 19 of the cage 17, and the spherical surface contact between the outer spherical surface 18 of the cage 17 and the inner spherical surface 10 of the outer joint member 12. Thus, frictional heating due to the spherical surface contacts can be reduced, whereby the loss of transmitted torque caused by the frictional heating can be reduced. Note that it is necessary to set the spherical surface gaps ($2 \times n_1$) ($2 \times n_2$) such that the spherical surface contact is reliably reduced while taking the PCD gap ($2 \times m$) into consideration.

In this case, when the spherical surface gaps ($2 \times n_1$), ($2 \times n_2$) described above are set smaller than 40 μm, the operability of the joint is deteriorated. In contrast, when the spherical surface gaps ($2 \times n_1$) ($2 \times n_2$) are set larger than 120 μm, slapping sound or vibration is generated. Note that, from the results of the experiment regarding the constant velocity universal joint of eight balls, the applicant of the present invention confirmed that the abnormal noise is not generated when the sum ($2 \times n_1$)+($2 \times n_2$) of the spherical surface gaps ($2 \times n_1$) ($2 \times n_2$) is equal to 240 μm. Accordingly, the upper limit value of the sum ($2 \times n_1$)+($2 \times n_2$) of the two spherical surface gaps ($2 \times n_1$), ($2 \times n_2$) is set to 240 μm, which is evenly divided for each of the two spherical surface gaps ($2 \times n_1$) ($2 \times n_2$) so as to be set the upper limit value thereof to 120 μm. Further, as a limit beyond which the effect of reducing the loss of transmitted torque can be exerted while taking the tolerance in manufacturing the joint into consideration, the lower limit value of the spherical surface gaps ($2 \times n_1$), ($2 \times n_2$) is set to 40 μm.

In this context, regarding the spherical surface contact between the outer spherical surface 13 of the inner joint member 15 and the inner spherical surface 19 of the cage 17, and the spherical surface contact between the outer spherical surface 18 of the cage 17 and the inner spherical surface 10 of the outer joint member 12, the nip angle γ8 of the ball 16 is formed with respect to the track grooves 11, 14 owing to the track offset, and hence the ball 16 presses the peripheral wall surface of the pocket of the cage 17 to the opening side of the outer joint member 12, whereby the cage 17 is moved to the opening side of the outer joint member 12. As a result, the outer spherical surface 18 of the cage 17 and the inner spherical surface 10 of the outer joint member 12 are brought into contact with each other on the opening side of the outer joint member 12, and the inner spherical surface 19 of the cage 17 and the outer spherical surface 13 of the inner joint member 15 are brought into contact with each other on the deep side of the outer joint member 12.

In the case where the operating angle is 0° in this state, when the torque is applied (refer to FIG. 3 regarding the torque application direction), the ball 16 further presses the peripheral wall surface of the pocket of the cage 17 to the opening side of the outer joint member 12. In this case, the track groove 14 of the inner joint member 15 and the track groove 11 of the outer joint member 12 are positioned without crossing but in parallel with each other. As a result, the cage 17 is moved so as to eliminate the spherical surface gaps ($2 \times n_1$), ($2 \times n_2$), whereby the outer spherical surface 18 of the cage 17 and the inner spherical surface 10 of the outer joint member 12 are brought into contact with each other.

When the operating angle is 0°, regardless of the size of the spherical surface gaps ($2 \times n_1$), ($2 \times n_2$), the loss of transmitted torque is not caused. However, when an operating angle is formed, the track groove 14 of the inner joint member 15 and the track groove 11 of the outer joint member 12 are positioned in parallel with each other at the phase angle 0° and the phase angle 180°. At other phase angles, the track groove 14 of the inner joint member 15 and the track groove 11 of the outer joint member 12 enter the state of crossing with each other. As a result, the ball 16 is sandwiched between the track groove 14 of the inner joint member 15 and the track groove 11 of the outer joint member 12, and hence the moving amount of the ball 16 for pressing the peripheral wall surface of the pocket of the cage 17 (moving amount of the cage) is determined based on the PCD gap ($2 \times m$).

Figure 8:
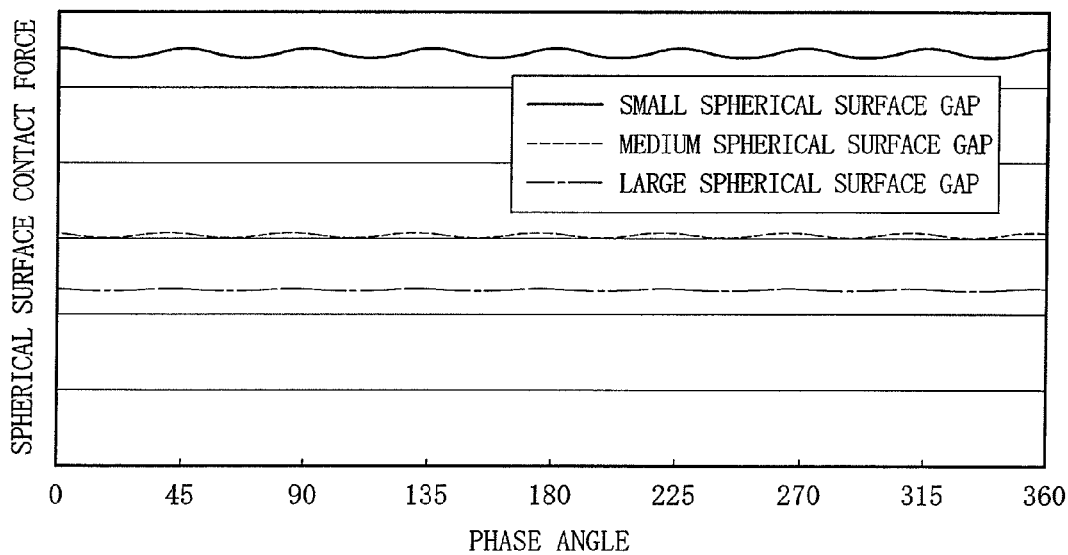
FIG. 8 is a characteristic graph showing a spherical surface contact force varied in accordance with the spherical surface gap.

In this case, in the state where the spherical surface gaps ($2 \times n_1$) ($2 \times n_2$) are larger than the movable amount of the cage 17 determined based on the PCD gap ($2 \times m$), the spherical surface contact force between the outer spherical surface 13 of the inner joint member 15 and the inner spherical surface 19 of the cage 17, and the spherical surface contact force between the outer spherical surface 18 of the cage 17 and the inner spherical surface 10 of the outer joint member 12 are decreased. As a result, the loss of transmitted torque caused by frictional heating dependent on the spherical surface contact forces can be reduced (refer to FIGS. 5, 6, and 8 (FIG. 3 regarding phase angle)). FIG. 8 shows that spherical surface contact force can be more reduced in the one in which the spherical surface gap is larger than in the one in which the spherical surface gap is smaller.

Meanwhile, the nip angle γ8 (refer to FIGS. 1 and 2) of each of the balls 16 located between the track grooves 11 of the outer joint member 12 and the track grooves 14 of the inner joint member 15 with respect to the track grooves 11, 14 is set to 8.5 to 12.5°, and the contact angle α8 (refer to FIG. 4) of each of the balls 16 with respect to the track grooves 11, 14 is set to 30 to 38°.

In this case, when the above-mentioned nip angle γ8 is smaller than 8.5°, the operability is deteriorated. In contrast, when the nip angle γ8 is larger than 12.5°, the contact surface pressure is increased between the cage and the inner and outer joint members, and hence it is difficult to reduce the friction, which leads to the difficulty in reducing the loss of transmitted torque. Further, when the above-mentioned contact angle α8 is smaller than 30°, with the increase in track load, the strength thereof is deteriorated and it is difficult to reduce the friction, which leads to the difficulty in reducing the loss of transmitted torque. In contrast, when the contact angle α8 is larger than 38°, the climbing up of the ball onto the track groove edge portion is liable to occur upon inputting large torque, and hence it is difficult to reduce the amount of slipping between the ball and the track groove of the outer joint member.

The results of the examination of the influence on the torque transmission efficiency in the internal structure of the constant velocity universal joint by means of mechanism analysis showed that, when the coefficient of friction at each contact portion is varied in the internal structure, the low friction generated at contact portions between the ball 16 and each of the track grooves 11, 14 contributed to the increase in torque transmission efficiency, and that the low friction generated at the spherical surface portions between the cage 17 and the outer joint member 12 and between the cage 17 and the inner joint member 15 did not contribute to the increase in torque transmission efficiency (refer to FIG. 9).

In this context, in order to generate the low friction at the contact portions between the ball 16 and each of the track grooves 11, 14, it is necessary to form a sufficient oil film layer so as to decrease the coefficient of friction. However, upon transmission of torque, a large force is applied to the contact portions between the ball 16 and each of the track grooves 11, 14, and hence a sufficient oil film layer may not be formed owing to the surface pressure thereof.

Accordingly, it is effective to perform surface treatment for allowing the lubricant to easily intervene into the contact portions between the ball 16 and each of the track grooves 11, 14 such that the more excellent oil film layer is formed, whereby the friction is suppressed which is generated owing to slipping caused between the ball 16 and each of the track grooves 11, 14 to increase the torque transmission efficiency.

In this context, a large number of minute recessed portions 41 (refer to the enlarged portion of FIG. 2) are formed in the surface of the ball 16 at random, and the surface roughness (arithmetic average roughness) of the surface of the ball 16 is set to Ra 0.03 to 0.6 μm, or preferably to Ra 0.05 to 0.15 μm. Further, the ratio of the total area of the minute recessed portions 41 with respect to the surface area of the ball 16 is set to 10 to 40%.

Further, the parameter SK value of the surface roughness of the ball 16 is set to −1.0 to −4.9. Herein, the SK value is a value representing the skewness of the distribution curve of the surface roughness, that is, the relativity of the amplitude distribution curve of the irregularity with respect to the mean line of the surface roughness. The SK value of the surface roughness is expressed by the following expression.

$$SK = \int (x-x_0)^3 \cdot P(x) dx / \sigma^3$$

In the expression, x represents height of roughness, $x_0$ represents average height of roughness, P(x) represents probability density function of amplitude of roughness, and σ represents mean squared roughness.

The parameter SK value is positive when the number of higher envelopes, which are formed with respect to the mean line of the surface roughness, of the amplitude distribution curve are large, zero when the numbers of higher and lower envelopes of the amplitude distribution curve are the same, and negative when the number of lower envelopes of the amplitude distribution curve are large. Accordingly, the parameter SK value of the surface roughness of the surface of the ball 16, in which a large number of minute recessed portions are formed, is negative.

The SK value and the surface roughness Ra of the surface of the ball 16, and the ratio of the total area of the minute recessed portions 41 are numerically limited, whereby the effective range is determined within which the oil film layer of the lubricant on the surface of the ball 16 is formed.

The measurements of those surface roughness Ra, SK value, and ratio of the total area of the minute recessed portions are performed at six portions separated substantially by 90° from each other on the surface of the ball, and the evaluation and the determination are made based on the mean value obtained therebetween. The determination on the effective range thereof is also based on this method. The quantitative measurement of the minute recessed portions 41 is conducted in the device configuration illustrated in FIG. 10. The capturing method involves mounting of the ball on a positioning device, enlarging of the surface of the ball with use of a microscope, capturing the image thereof with a CCD camera into an image analyzing device and an image processing apparatus including a personal computer, and analyzing the white portion of the image as a surface flat portion and the black portion as a recessed portion. The size and the distribution thereof are calculated with reference to the black portion of the image as the recessed portion so as to obtain the surface area ratio for making evaluation. The detail of the surface examination method is disclosed in JP 2001-183124 A.

The surface roughness and the SK value are measured with use of the measurement apparatus Form Talysurf (manufactured by Taylor Hobson K. K.). The measurement is conducted under the following condition: Cutoff type: Gaussian, measured length: 5 λ, number of cutoff: 6, cutoff wavelength: 0.25 mm, measurement magnification: 10,000 times, measurement speed: 0.30 mm/s. Note that, while examples of the method for forming a large number of minute recessed portions 41 in the surface of the ball 16 include special barrel polishing treatment, the surface working may be performed otherwise by shot blasting treatment or the like.

Further, the lubricant of lower coefficient of friction is preferable. For example, it is preferable to use a lubricant of the coefficient of friction having the upper limit value of 0.07, which is measured by a Savan's friction and wear testing machine. In this case, as illustrated in FIG. 11, in the Savan's friction and wear testing machine, a steel ball 32 of ¼ inch is held in press contact with a rotary ring 31 having a diameter of 40 mm and a thickness of 4 mm. In measuring the coefficient of friction, the rotary ring 31 is rotated at a circumferential velocity of 108 m/min, a load of 12.7 N is applied, and the lubricant is supplied onto the surface of the rotary ring 31 from the lower end of the rotary ring 31 via a sponge 33 so as to detect the movement of an air slide 34 supporting the steel ball 32 with use of a load cell 35 and measure the coefficient of friction. Specific examples of the lubricant include a urea grease. The urea grease is of a consistency number 0 to 2. Note that, when the consistency number is smaller than 0, the sealing structure is complicated, and the lubricant is liable to be depleted owing to a centrifugal force upon used at high speed. Further, when the consistency number is larger than 2, it is difficult for the lubricant to intervene thereinto, which leads to large contact resistance causing the loss of torque.

During rotation of the joint, even in the state where the pressing force acts between the ball 16 and each of the track grooves 11, 14, the lubricant having intruded into the large number of minute recessed portions 41 in the surface of the ball 16 may form a preferable oil film layer while interposed on the contact boundary surfaces between the ball 16 and each of the track grooves 11, 14.

Figure 12:
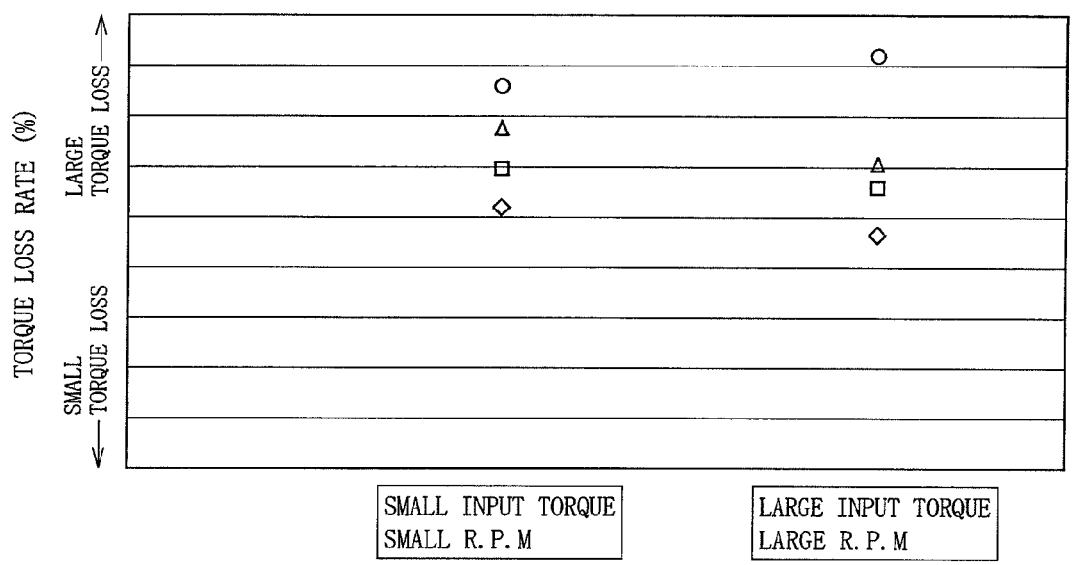
FIG. 12 is a characteristic graph showing torque loss ratios in a case of using a lubricant of low coefficient of friction and in a comparative example.

FIG. 12 shows a relationship between the coefficient of friction of the lubricant used in the fixed type constant velocity universal joint and the torque loss rate at that time. Lubricants of four types of different coefficients of friction from each other were used, and the torque loss rate of each of the lubricants was measured under the two conditions where the torque input to the joint was small and the r.p.m was small, and where the torque input to the joint was large and the r.p.m was large. The marks plotted in the graph represent as follows: a circular mark represents a lubricant of a coefficient of friction of substantially 0.1, and the other triangular mark, square mark, diamond shaped mark each represent a lubricant of a coefficient of friction equal to or smaller than 0.07. Further, FIG. 12 confirms that, when compared with the case where the lubricant of a coefficient of friction of substantially 0.1 is used, the torque loss rate is decreased when the lubricant of a coefficient of friction equal to or smaller than 0.07 is used, that is, confirms that the torque transmission efficiency is increased.

Figure 13:
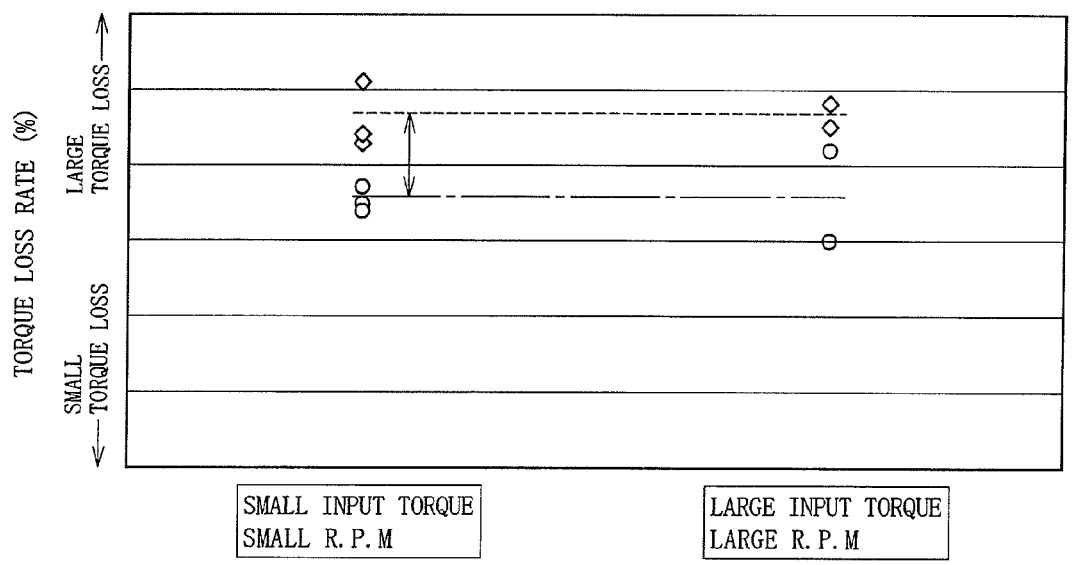
FIG. 13 is a characteristic graph showing torque loss ratios in a case of using the ball with the large number of minute recessed portions formed therein and in the comparative example.

FIG. 13 illustrates the comparison of the torque loss rate between each of the cases where the joint (joint of the present invention) has the balls 16 each including a surface on which the large number of minute recessed portions 41 are formed, and where the joint (joint of comparative example) has the balls 16 without minute recessed portions. In this case also, the torque loss rate of each of the joints was measured under the two conditions where the torque input to the joint was small and the r.p.m was small, and where the torque input to the joint was large and the r.p.m was large. Note that, the lubricant of the same coefficient of friction is sealed in both the joint of the present invention and the joint of the comparative example. In the graph, a circular mark represents experimental data of the joint of the present invention, and a diamond shaped mark represents experimental data of the joint of the comparative example. Further, a dashed line is a mean line of the data of the present invention, and a dotted line is a mean line of the data of the comparative example. As understood from the difference between those two mean lines, the torque loss rate in the present invention is smaller than that in the comparative example, and the torque transmission efficiency is increased.

Figure 14:
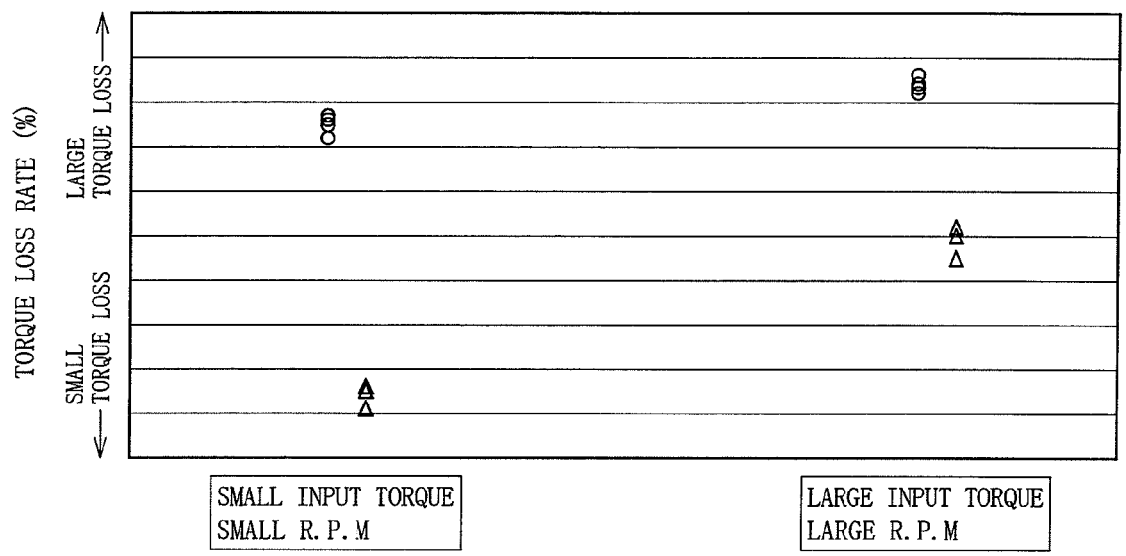
FIG. 14 is a characteristic graph showing torque loss ratios in a case of using the lubricant of low coefficient of friction and the ball with the large number of minute recessed portions formed therein so as to set the PCD gap and the spherical surface gap to appropriate values, and in the comparative example.

Further, FIG. 14 is a graph showing the torque loss rate of each of the joint (joint of the present invention) in which the lubricant of a coefficient of friction equal to or smaller than 0.07 is used, which has the balls 16 each provided with the large number of minute recessed portions 41, and in which the PCD gap and the spherical surface gap are set within the above-mentioned range of appropriate value, and the joint (joint of the comparative example) in which the lubricant of a coefficient of friction of substantially 0.1 is used, which has the balls 16 free from the minute recessed portions, and in which the PCD gap and the spherical surface gap are set out of the above-mentioned range of appropriate value. In this case also, the torque loss rate of each of the joints was measured under the two conditions where the torque input to the joint was small and the r.p.m was small, and where the torque input to the joint was large and the r.p.m was large. In the graph, a circular mark represents the data of the comparative example, and a triangular mark represents the data of the present invention. The results of FIG. 14 confirm that, in the case of the present invention, the torque loss rate is smaller than that in the comparative example, and the torque transmission efficiency is increased.

The present invention is not limited to the above-mentioned embodiments. As a matter of course, the present invention may be made in further various modes without departing from the gist and scope of the present invention. The scope of the present invention is described in the scope of claims, and the meanings equivalent to those described in the scope of claims and all the modifications thereof are included therein.

The invention claimed is:

1. A fixed type constant velocity universal joint, comprising:
    an outer joint member having an inner spherical surface in which a plurality of track grooves extending in an axial direction are formed;
    an inner joint member having an outer spherical surface in which a plurality of track grooves extending in the axial direction while paired with the track grooves of the outer joint member are formed;
    a plurality of balls interposed between the track grooves of the outer joint member and the track grooves of the inner joint member, and being configured and arranged to transmit a torque; and
    a cage interposed between the inner spherical surface of the outer joint member and the outer spherical surface of the inner joint member, and being configured to hold the plurality of balls,
    the outer joint member and the inner joint member each having a center curvature of the track grooves being offset from each other in a direction opposite to the axial direction by an equal distance with respect to a joint center, and
    wherein a pitch circle diameter (PCD) gap in a ball track formed between the track grooves of the outer joint member and the track grooves of the inner joint member is equal to or larger than 25 µm, and the plurality of balls are configured and arranged in the ball track such that upon transmission of rotational torque to the constant velocity universal joint, contact of each of the plurality of balls with a portion on a no-load side of the ball track is reduced relative to a PCD gap less than 25 µm, so as to reduce frictional heating.

2. The fixed type constant velocity universal joint according to claim 1, wherein the PCD gap is 40 to 85 µm.

3. The fixed type constant velocity universal joint according to claim 2, wherein:
    the balls each have a surface with a large number of minute recessed portions formed therein at random.

4. The fixed type constant velocity universal joint according to claim 1, wherein:
    the balls each have a surface with a large number of minute recessed portions formed therein at random.

5. The fixed type constant velocity universal joint according to claim 4, wherein:
    a surface roughness of each of the balls in which the minute recessed portions are formed is Ra 0.03 to 0.6 µm;
    the skewness of the distribution curve of the surface roughness of each of the balls is equal to or smaller than −1.0; and
    a ratio of a total area of the large number of minute recessed portions with respect to a surface area of each of the balls is 10 to 40%.

6. The fixed type constant velocity universal joint according to claim 5, wherein:
    the surface roughness of each of the balls is set to Ra 0.05 to 0.15 µm; and
    the skewness of the distribution curve of the surface roughness of each of the balls is 4.9 to −1.0.

7. The fixed type constant velocity universal joint according to claim 1, wherein a number of the balls are eight.

8. The fixed type constant velocity universal joint according to claim 7, wherein:
a nip angle of each of the balls located between the track grooves of the outer joint member and the track grooves of the inner joint member with respect to the track grooves is 8.5 to 12.5°; and
a contact angle of each of the balls with respect to the track grooves is 30 to 38°.

9. A fixed type constant velocity universal joint, comprising:
an outer joint member having an inner spherical surface in which a plurality of track grooves extending in an axial direction are formed;
an inner joint member having an outer spherical surface in which a plurality of track grooves extending in the axial direction while paired with the track grooves of the outer joint member are formed;
a plurality of balls interposed between the track grooves of the outer joint member and the track grooves of the inner joint member, and being configured and arranged to transmit a torque; and
a cage interposed between the inner spherical surface of the outer joint member and the outer spherical surface of the inner joint member, and being configured to hold the plurality of balls,
the outer joint member and the inner joint member each having a center curvature of the track grooves being offset from each other in a direction opposite to the axial direction by an equal distance with respect to a joint center, wherein:
a spherical surface gap formed between the outer spherical surface of the inner joint member and an inner spherical surface of the cage is equal to or larger than 40 μm such that the spherical surface contact between the outer spherical surface of the inner joint member and the inner spherical surface of the cage is reduced relative to contact between an outer spherical surface of an inner joint member and an inner spherical surface of a cage having a spherical surface gap less than 40 μm so as to reduce frictional heating; and
a spherical surface gap formed between an outer spherical surface of the cage and the inner spherical surface of the outer joint member is equal to or larger than 40 μm, such that the spherical surface contact between the inner spherical surface of the outer joint member and the outer spherical surface of cage is reduced relative to contact between an inner spherical surface of an outer joint member and an outer spherical surface of an cage having a spherical surface gap less than 40 μm so as to reduce frictional heating.

10. The fixed type constant velocity universal joint according to claim 9, wherein:
the spherical surface gap formed between the outer spherical surface of the inner joint member and the inner spherical surface of the cage is 50 to 120 μm; and
the spherical surface gap formed between the outer spherical surface of the cage and the inner spherical surface of the outer joint member is 50 to 120 μm.

11. The fixed type constant velocity universal joint according to claim 9, wherein:
the balls each have a surface with a large number of minute recessed portions formed therein at random.

12. The fixed type constant velocity universal joint according to claim 9, wherein a number of the balls are eight.

13. A fixed type constant velocity universal joint, comprising:
an outer joint member having an inner spherical surface in which a plurality of track grooves extending in an axial direction are formed;
an inner joint member having an outer spherical surface in which a plurality of track grooves extending in the axial direction while paired with the track grooves of the outer joint member are formed;
a plurality of balls interposed between the track grooves of the outer joint member and the track grooves of the inner joint member, for transmitting a torque; and
a cage interposed between the inner spherical surface of the outer joint member and the outer spherical surface of the inner joint member, for holding the plurality of balls,
the outer joint member and the inner joint member each having a center curvature of the track grooves being offset from each other in a direction opposite to the axial direction by an equal distance with respect to a joint center, wherein
a pitch circle diameter (PCD) gap in a ball track formed between the track grooves of the outer joint member and the track grooves of the inner joint member is equal to or larger than 25 μm;
a spherical surface gap formed between the outer spherical surface of the inner joint member and an inner spherical surface of the cage is equal to or larger than 40 μm, such that the spherical surface contact between the outer spherical surface of the inner joint member and the inner spherical surface of the cage is reduced relative to contact between an outer spherical surface of an inner joint member and an inner spherical surface of a cage having a spherical surface gap less than 40 μm so as to reduce frictional heating;
a spherical surface gap formed between an outer spherical surface of the cage and the inner spherical surface of the outer joint member is equal to or larger than 40 μm, such that the spherical surface contact between the outer spherical surface of a cage and the inner spherical surface of the outer joint member is reduced relative to contact between an outer spherical surface of a cage and an inner spherical surface of an outer joint member having a spherical surface gap less than 40 μm so as to reduce frictional heating; and
the plurality of balls are configured and arranged in the ball track such that upon transmission of rotational torque to the constant velocity universal joint, contact of each of the plurality of balls with a portion on a no-load side of the ball track is reduced relative to a PCD gap less than 25 μm so as to reduce frictional heating.

14. The fixed type constant velocity universal joint according to claim 13, wherein:
the PCD gap is 40 to 85 μm;
the spherical surface gap formed between the outer spherical surface of the inner joint member and the inner spherical surface of the cage is 50 to 120 μm; and
the spherical surface gap formed between the outer spherical surface of the cage and the inner spherical surface of the outer joint member is 50 to 120 μm.

15. The fixed type constant velocity universal joint according to claim 13, wherein the PCD gap is 40 to 85 μm.

16. The fixed type constant velocity universal joint according to claim 13, wherein:
the spherical surface gap formed between the outer spherical surface of the inner joint member and the inner spherical surface of the cage is 50 to 120 μm; and
the spherical surface gap formed between the outer spherical surface of the cage and the inner spherical surface of the outer joint member is 50 to 120 μm.

17. The fixed type constant velocity universal joint according to claim 13, wherein:
the balls each have a surface with a large number of minute recessed portions formed therein at random.

18. The fixed type constant velocity universal joint according to claim 13, wherein a number of the balls are eight.

* * * * *